US00RE42861E

(19) United States
(12) Reissued Patent
Borza

(10) Patent Number: US RE42,861 E
(45) Date of Reissued Patent: Oct. 18, 2011

(54) METHOD OF DISTRIBUTING PIRACY PROTECTED COMPUTER SOFTWARE

(75) Inventor: Stephen J. Borza, Ottawa (CA)

(73) Assignee: Activcard Ireland, Ltd., Dublin (IE)

(21) Appl. No.: 11/400,074

(22) Filed: Apr. 7, 2006

Related U.S. Patent Documents

Reissue of:
(64) Patent No.: 6,721,891
Issued: Apr. 13, 2004
Appl. No.: 09/277,827
PCT Filed: Mar. 29, 1999

(51) Int. Cl.
*H04L 9/32* (2006.01)
*G06F 21/22* (2006.01)
*G06F 7/04* (2006.01)

(52) U.S. Cl. ..... 726/20; 726/7; 726/9; 726/19; 726/27; 713/186

(58) Field of Classification Search ..... None
See application file for complete search history.

(56) References Cited

U.S. PATENT DOCUMENTS

| | | | | | |
|---|---|---|---|---|---|
| 4,658,093 | A | | 4/1987 | Hellman | 380/25 |
| 4,683,553 | A | | 7/1987 | Mollier | 380/4 |
| 4,791,565 | A | | 12/1988 | Dunham et al. | 364/200 |
| 5,260,999 | A | | 11/1993 | Wyman | 380/4 |
| 5,495,411 | A | | 2/1996 | Ananda | 364/401 |
| 5,509,070 | A | | 4/1996 | Schull | 380/4 |
| 5,566,327 | A | * | 10/1996 | Sehr | 707/104.1 |
| 5,615,061 | A | | 3/1997 | Singh | 360/60 |
| 5,625,690 | A | | 4/1997 | Michel et al. | 380/4 |
| 5,692,917 | A | | 12/1997 | Rieb et al. | 439/225 |
| 5,745,879 | A | | 4/1998 | Wyman | 705/1 |
| 5,754,646 | A | | 5/1998 | Williams et al. | 380/4 |
| 5,757,907 | A | | 5/1998 | Cooper et al. | 380/4 |
| 5,790,663 | A | | 8/1998 | Lee et al. | 380/4 |
| 5,790,668 | A | | 8/1998 | Tomko | 380/25 |
| 5,796,824 | A | | 8/1998 | Hasebe et al. | 380/4 |
| 5,841,868 | A | | 11/1998 | Helbig, Sr. | 380/25 |
| 5,848,231 | A | | 12/1998 | Teitelbaum et al. | 713/200 |
| 5,893,910 | A | | 4/1999 | Martineau et al. | 707/10 |

(Continued)

OTHER PUBLICATIONS

Harvey, Mike. "Why veins could replace fingerprints and retinas as most secure form of ID." *Times Online* Nov. 11, 2008, 2 pages <http://technology.timesonline.co.uk/tol/news/tech_and_web/articles5129384.ece>.

(Continued)

*Primary Examiner* — Christopher A Revak
(74) *Attorney, Agent, or Firm* — Perkins Coie LLP

(57) ABSTRACT

A method and a system for disabling execution of a software application stored within a computer absent data indicative of an authorized use of the software application are disclosed. At start up or during execution of a software application a user is prompted for user authorization information. Using a processor within a smart card the received user authorization information is compared with user authorization information stored in memory of the smart card to produce a comparison result. If the comparison result is indicative of an authorized user of the software application, then data indicative of the authorized use of the software application is provided from the smart card to the computer. Upon receipt of the data indicative of the authorized use of the software application execution of the software application is continued. When the data is not data indicative of the authorized use of the software application further execution of the software application is disabled. For example, biometric information in the form of a fingerprint may be used for user authorization.

44 Claims, 10 Drawing Sheets

U.S. PATENT DOCUMENTS

| | | | | |
|---|---|---|---|---|
| 5,923,884 | A * | 7/1999 | Peyret et al. | 717/167 |
| 5,933,498 | A | 8/1999 | Schneck et al. | 705/54 |
| 6,044,471 | A * | 3/2000 | Colvin | 726/28 |
| 6,067,621 | A * | 5/2000 | Yu et al. | 713/172 |
| 6,087,955 | A | 7/2000 | Gray | 340/825.34 |
| 6,134,659 | A * | 10/2000 | Sprong et al. | 713/190 |
| 6,314,409 | B2 | 11/2001 | Schneck et al. | 705/54 |
| 6,655,585 | B2 * | 12/2003 | Shinn | 235/382 |
| 7,366,918 | B2 * | 4/2008 | Barlow et al. | 713/193 |
| 7,552,340 | B2 * | 6/2009 | Ooi et al. | 713/186 |
| 2003/0149877 | A1 * | 8/2003 | Liao et al. | 713/172 |
| 2005/0091507 | A1 * | 4/2005 | Lee et al. | 713/182 |
| 2005/0139685 | A1 * | 6/2005 | Kozlay | 235/492 |
| 2005/0144446 | A1 * | 6/2005 | Kishimoto | 713/168 |
| 2005/0216739 | A1 * | 9/2005 | Lee et al. | 713/168 |
| 2005/0216763 | A1 * | 9/2005 | Lee et al. | 713/200 |

OTHER PUBLICATIONS

Sanderson, "Distributed file systems: stepping stone to distributed computing," *LAN Technology,* May 1991, 7(5), 41-50.

* cited by examiner

METHOD OF DISTRIBUTING PIRACY PROTECTED COMPUTER SOFTWARE

Matter enclosed in heavy brackets [ ] appears in the original patent but forms no part of this reissue specification; matter printed in italics indicates the additions made by reissue.

FIELD OF THE INVENTION

This invention relates generally to a method for disabling execution of a software application stored within a computer absent data indicative of an authorised use of the software application and more particularly relates to a method for disabling execution of a software application using a smart card.

BACKGROUND OF THE INVENTION

Software piracy is causing huge losses in profits for companies developing and selling computer software. The sale and distribution of software designed for general use is based on the assumption that a software provider only wishes to sell a right to use the software to one person or to a select group of people. The seller specifically does not wish the purchaser to distribute the software to other users or to resell the software. Various methods are employed to prevent the purchaser from distributing the software. The most common method of software distribution is via a storage medium. The user is often unrestricted from either copying the software from this storage medium to another one or installing the software from a same storage medium on different computers. This results in undesirable software piracy.

In the past, piracy protection schemes were implemented to prevent a purchaser from making a back up copy of a software application. When a storage medium, such as a floppy disk, that is copy protected becomes damaged, the software provider must replace the storage medium. Some software providers have included a backup copy of the software application along with the original copy to lessen inconvenience when the original copy is damaged, but sometimes even these "backup" copies fail.

Some software providers have avoided software copy protection schemes. Instead these software providers rely on the honesty of the purchaser, the fact that the documentation is difficult to duplicate, and/or a license agreement that the purchaser is expected to honour. The license agreement makes it illicit to distribute the software. Many software providers view convenience as essential for software users and therefore are wary of software piracy protection methods that inconvenience users in any way.

Another method of software protection involves writing to an installation disk to indicate that installation has occurred. This limits a disk to one use. This has many of the aforementioned drawbacks and also is unworkable with CD ROM technology. Using CD ROM technology, a software provider writes a program and other information to a CD ROM which can be written to only once using special hardware for that purpose. Therefore, adding information to a CD ROM during installation is not possible.

With the increasing use of digital communications such as the Internet, computer software is now commonly distributed using these means. In this case, the aforementioned methods of preventing undesired proliferation of pirated software can not be applied; users require some form of backup and this backup is easily distributed to other users. Also, interception of software by unauthorised third parties is a significant risk to software providers.

Computer security is fast becoming an important issue. With the proliferation of computers and computer networks into all aspects of business and daily life—financial, medical, education, government, and communications—the concern over secure file access is growing. Using passwords is a common method of providing security. Password protection is employed for computer network security, automatic teller machines, telephone banking, calling cards, and telephone answering services. These systems generally require knowledge of an entry code that has been selected by a user or has been configured in advance. Examples of commonly used security codes for preventing software piracy include information from a user's manual and a serial number. Unfortunately for use in copy protection, security codes are unworkable since the software is easily transferred with the security code.

A security access system that provides substantially secure access and does not require a password or access code is a biometric identification system. A biometric identification system accepts unique biometric information from a user and identifies the user by matching the information against information belonging to registered users of the system. One such biometric identification system is a fingerprint recognition system.

The use of a biometric imaging device with a personal computer is becoming widespread. In a fingerprint input transducer or sensor, the finger under investigation is usually pressed against a flat surface, such as a side of a glass plate; the ridge and valley pattern of the finger tip is sensed by a sensing means such as an interrogating light beam. Various optical devices are known which employ prisms upon which a finger whose print is to be identified is placed. The prism has a first surface, a platen, upon which a finger is placed, a second surface disposed at an acute angle to the first surface through which the fingerprint is viewed and a third illumination surface through which light is directed into the prism. In some cases, the illumination surface is at an acute angle to the first surface, as seen for example, in U.S. Pat. Nos. 5,187,482 and 5,187,748. In other cases, the illumination surface is parallel to the first surface, as seen for example, in U.S. Pat. Nos. 5,109,427 and 5,233,404. Fingerprint identification devices of this nature are generally used to control the building-access or information-access of individuals to buildings, rooms, and devices such as computer terminals.

U.S. Pat. No. 4,353,056 in the name of Tsikos issued Oct. 5, 1982, discloses an alternative kind of fingerprint sensor that uses a capacitive sensing approach. The described sensor has a two dimensional, row and column, array of capacitors, each comprising a pair of spaced electrodes, carried in a sensing member and covered by an insulating film. The sensors rely upon deformation to the sensing member caused by a finger being placed thereon so as to vary locally the spacing between capacitor electrodes, according to the ridge/trough pattern of the fingerprint, and hence, the capacitance of the capacitors. In one arrangement, the capacitors of each column are connected in series with the columns of capacitors connected in parallel and a voltage is applied across the columns. In another arrangement, a voltage is applied to each individual capacitor in the array. Sensing in the respective two arrangements is accomplished by detecting the change of voltage distribution in the series connected capacitors or by measuring the voltage values of the individual capacitances resulting from local deformation. To achieve this, an individual connection is required from the detection circuit to each capacitor.

Before the advent of computers and imaging devices, research was conducted into fingerprint characterisation and identification. Today, much of the research focus in biometrics has been directed toward improving the input transducer and the quality of the biometric input data. Fingerprint characterisation is well known and can involve many aspects of fingerprint analysis. The analysis of fingerprints is discussed in the following references, which are hereby incorporated by reference:

Xiao Qinghan and Bian Zhaoqi,: An approach to Fingerprint Identification By Using the Attributes of Feature Lines of Fingerprint," IEEE Pattern Recognition, pp 663, 1986; C. B. Shelman, "Fingerprint Classification—Theory and Application," Proc. 76 Carnahan Conference on Electronic Crime Countermeasures, 1976;

Feri Pernus, Stanko Kovacic, and Ludvik Gyergyek, "Minutaie Based Fingerprint Registration," IEEE Pattern Recognition, pp 1380, 1980;

J. A. Ratkovic, F. W. Blackwell, and H. H. Bailey, "Concepts for a Next Generation Automated Fingerprint System," Proc. 78 Carnahan Conference on Electronic Crime Countermeasures, 1978;

K. Millard, "An approach to the Automatic Retrieval of Latent Fingerprints," Proc. 75 Carnahan Conference on Electronic Crime Countermeasures, 1975;

Moayer and K. S. Fu, "A Syntactic Approach to Fingerprint Pattern Recognition," Memo Np. 73-18, Purdue University, School of Electrical Engineering, 1973;

Wegstein, An Automated Fingerprint Identification System, NBS special publication, U.S. Department of Commerce/National Bureau of Standards, ISSN 0083-1883; no. 500-89, 1982;

Moenssens, Andre A., Fingerprint Techniques, Chilton Book Co., 1971; and, Wegstein and J. F. Rafferty, The LX39 Latent Fingerprint Matcher, NBS special publication, U.S. Department of Commerce/National Bureau of Standards; no. 500-36, 1978.

OBJECT OF THE INVENTION

It is an object of this invention to disable execution of a software application stored within a computer absent data indicative of an authorised use of the software application using a smart card.

STATEMENT OF THE INVENTION

In accordance with the invention there is provided a method for protecting a software application from piracy comprising the steps of:

providing data indicative of an authorised use of the software application;

executing a first portion of the software application;

receiving user authorisation information;

using a processor within a peripheral device, comparing the received user authorisation information with user authorisation information stored in memory of the peripheral device to produce a comparison result and, if the comparison result is indicative of the authorised user of the software application, providing data from the peripheral device to the computer, the data indicative of the authorised use of the software application on the computer; and, executing a second portion of the software application only upon receipt of the data indicative of the authorised use of the software application.

In accordance with the invention there is also provided a method for protecting a software application from piracy comprising the steps of:

providing data indicative of an authorised use of the software application;

executing a first portion of the software application using a first processor;

receiving user authorisation information from an input device disposed within a first housing;

transmitting the user authorisation information to a second processor within a second housing, the second housing comprising memory, wherein the user authorisation information is unavailable to the first processor; using the second processor, comparing the received user authorisation information with user authorisation information stored in memory to produce a comparison result and, if the comparison result is indicative of the authorised user of the software application, providing data from the second processor to the first processor, the data indicative of the authorised use of the software application on the first processor; and, executing a second portion of the software application only upon receipt of the data indicative of the authorised use of the software application.

In accordance with another aspect of the invention there is provided a system for protecting a software application from piracy comprising:

a software application for execution on a computer, the software application including executable commands for preventing execution of a portion of the software application absent data indicative of an authorised use of the software application; and a peripheral device including:

a housing;

a port for interfacing the peripheral device to the computer; memory within the housing, the memory for storing user authorisation information indicative of an authorised user of the software application; and, a processor within the housing for receiving authorisation information provided by a user, for comparing received authorisation information with the user authorisation information stored in the memory to produce a comparison result and, if the comparison result is indicative of an authorised user of the software application, providing data from the device to the computer, the data indicative of an authorised use of the software application on the computer, wherein the software application execution is at least partially prevented until the data indicative of the authorised use of the software application is received.

Preferably the peripheral device comprises a smart card reader and a smart card. More preferably, the peripheral device also comprises a biometric sensor in the form of a fingerprint imager.

BRIEF DESCRIPTION OF THE DRAWINGS

An exemplary embodiment of the invention will now be described in conjunction with the attached drawings, in which:

FIG. 1b is a simplified flow diagram of a method according to the invention for protecting a software application from piracy using the system described in FIG. 1a;

FIG. 2b is a simplified flow diagram of an installation of a software application using the system described in FIG. 2a;

FIG. 2c is a simplified flow diagram of an execution of a software application using the system described in FIG. 2a;

FIG. 3b is a simplified flow diagram of a method according to the invention for protecting a software application from piracy using the system described in FIG. 3a;

Figure 4A:
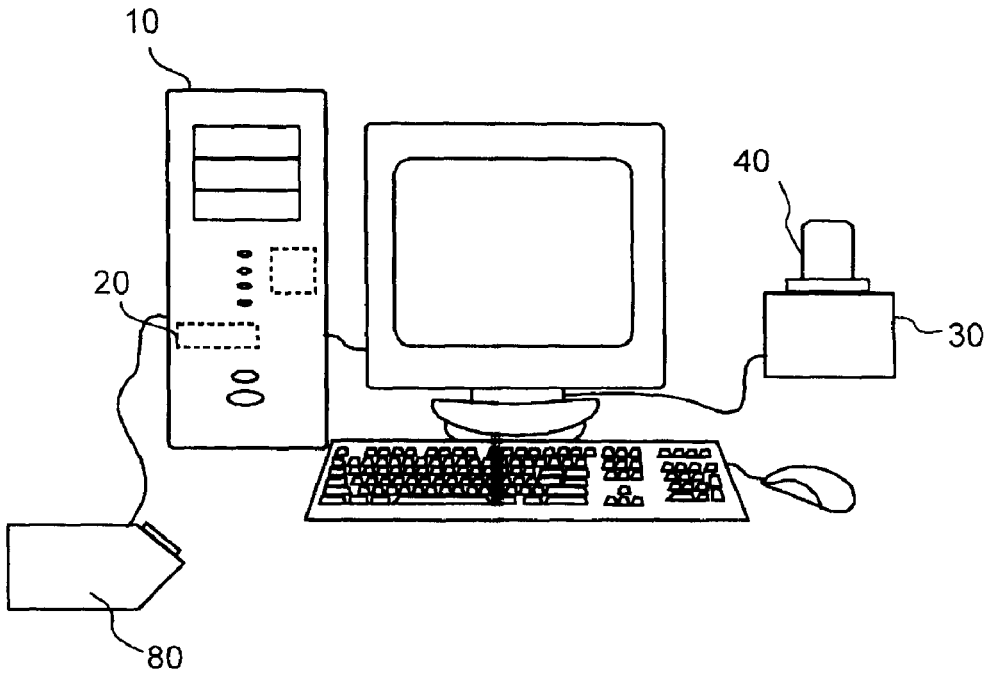
Figure 4B:
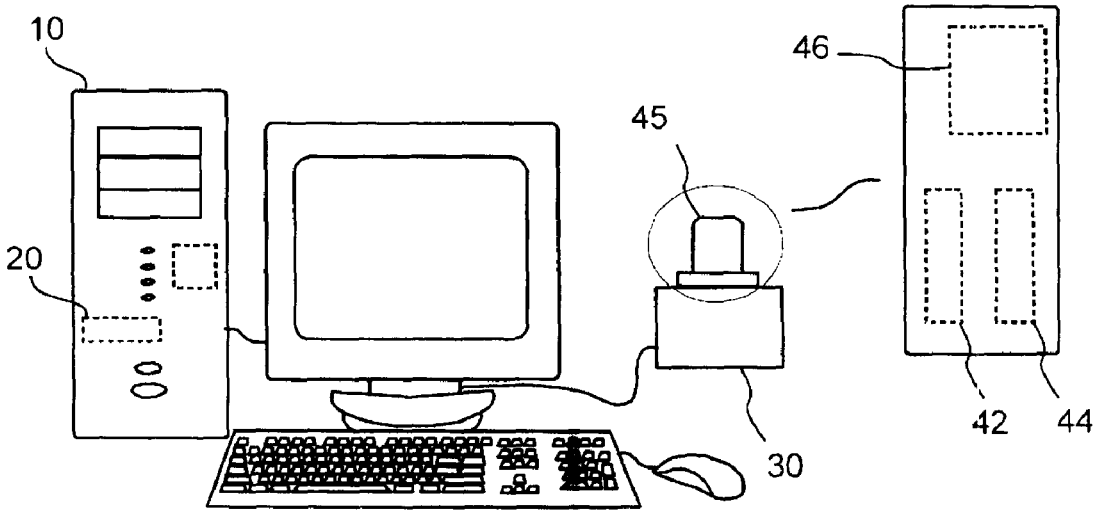
Figure 5:
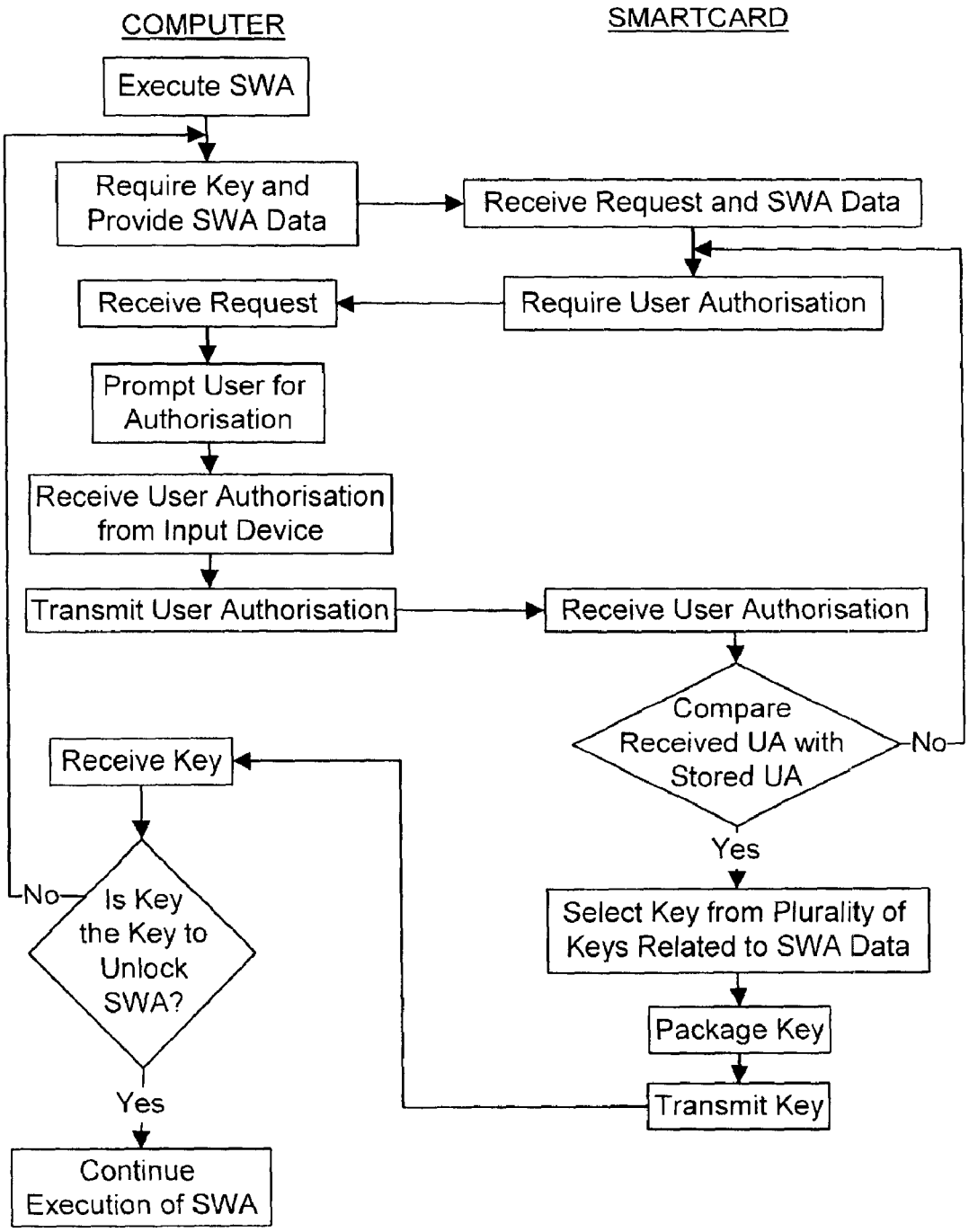
Figure 6:
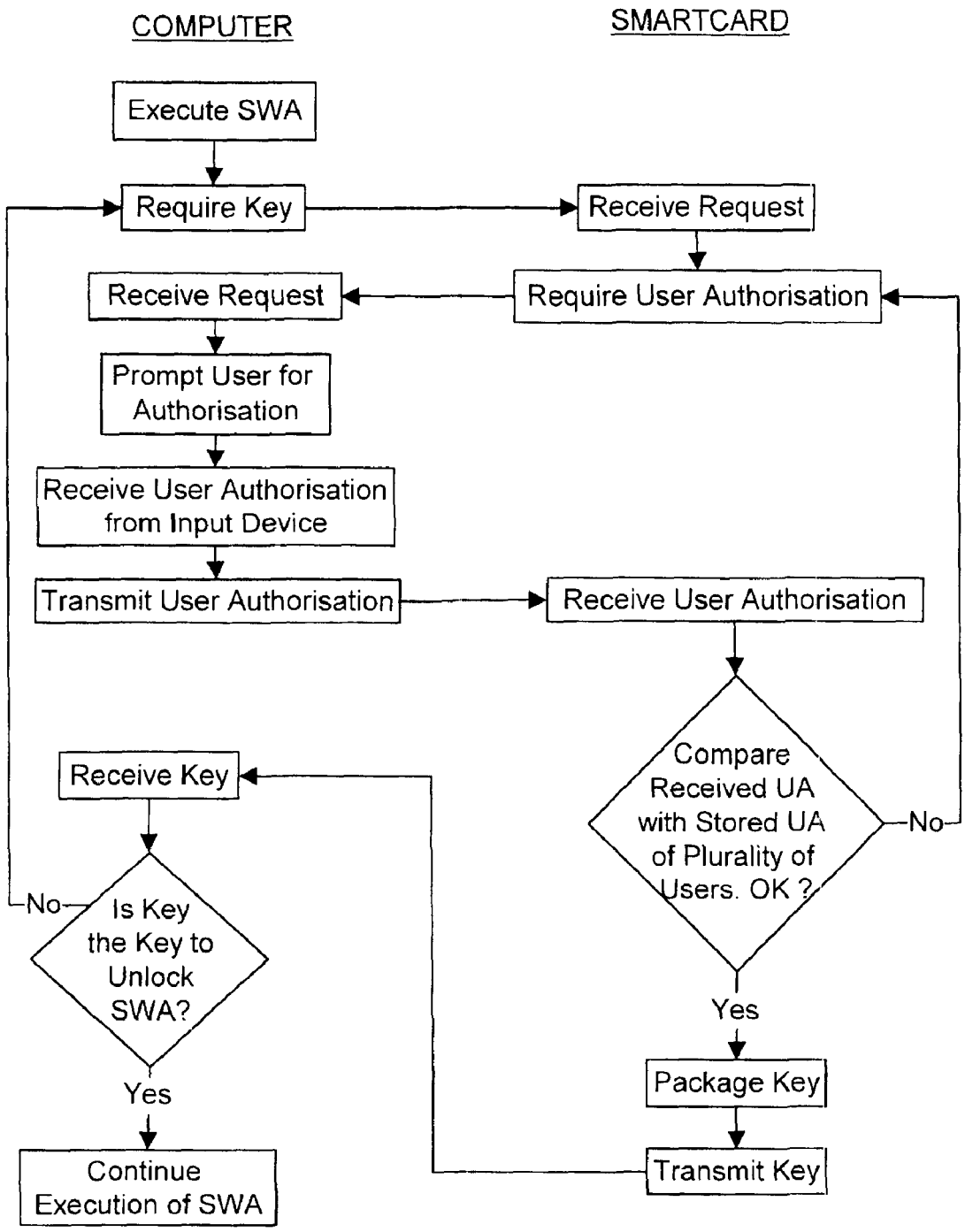
Figure 7A:
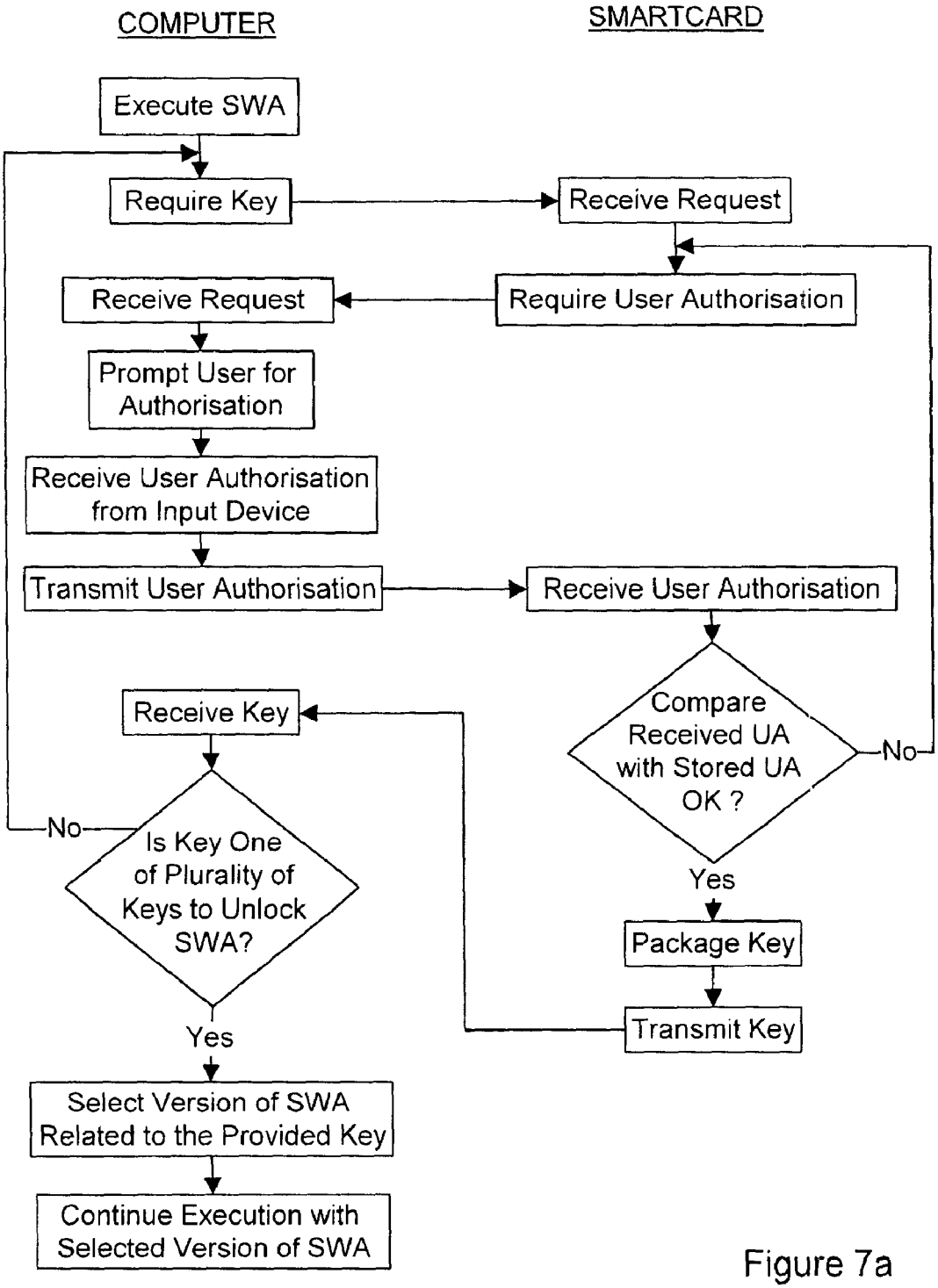
Figure 7B:
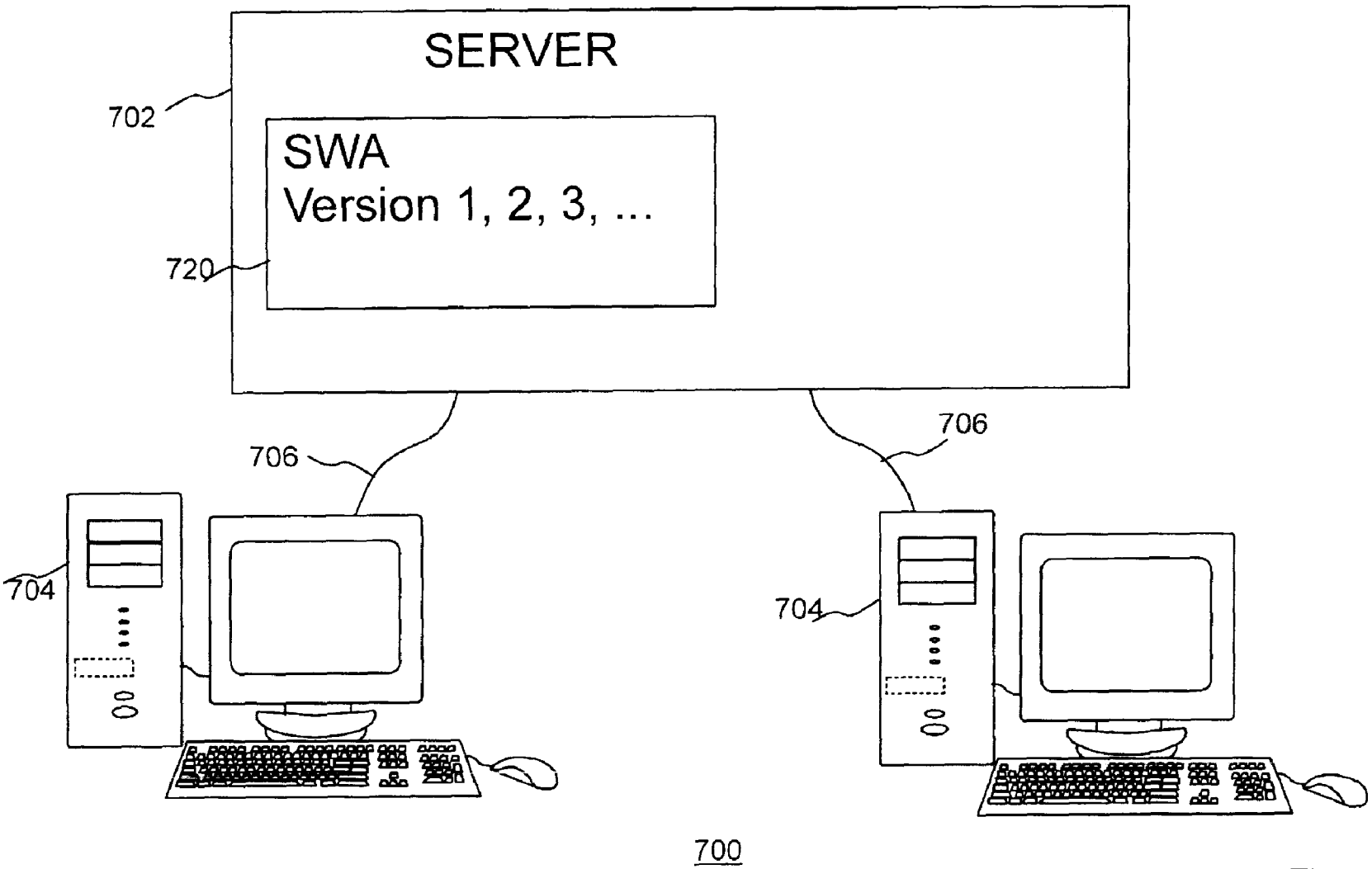
Figure 8:
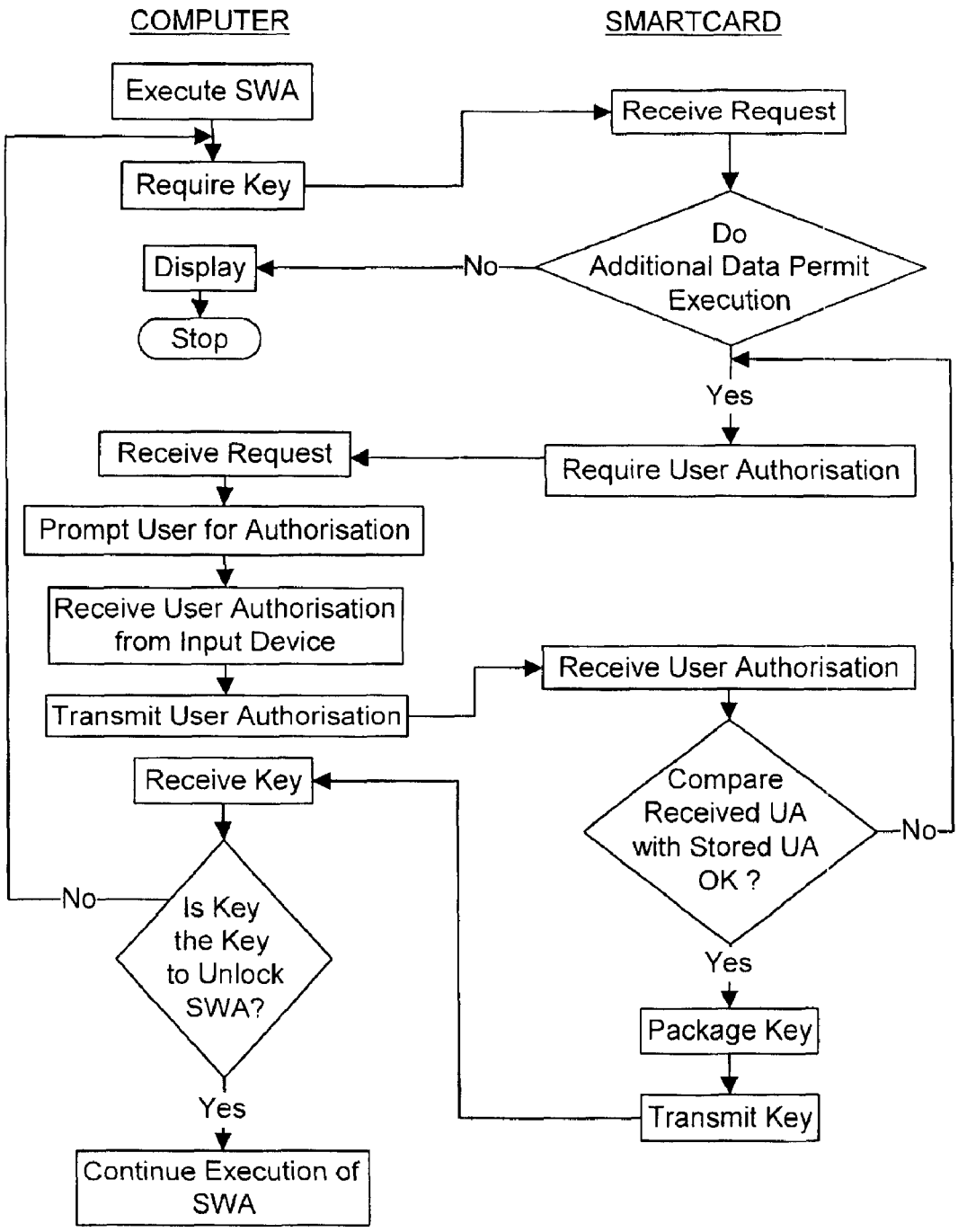

FIG: 4a is a simplified diagram of a system according to the invention for protecting a software application from piracy comprising a smart card reader and a contact imager connected to a computer;

FIG. 4b is a simplified diagram of a system according to the invention for protecting a software application from piracy comprising a smart card with a contact imager;

FIG. 5 is a simplified flow diagram of a method according to the invention for protecting a software application from piracy using one smart card for different software applications;

FIG. 6 is a simplified flow diagram of a method according to the invention for protecting a software application from piracy using one smart card for different users;

FIG. 7a is a simplified flow diagram of a method according to the invention for protecting a software application from piracy using different versions of the software application for different users;

FIG.7b is a simplified diagram of a computer network for implementing the method described in FIG. 7a; and, FIG. 8 is a simplified flow diagram of a method according to the invention for protecting a software application from piracy storing additional data on the smart card.

DETAILED DESCRIPTION

With the advent of personal computers, software piracy—copying software in which copyright exists—proliferated. With the implementation of graphical user interfaces, copying software has become a matter of dragging files from an original diskette to a blank diskette. In fact, software piracy is so prolific that it is estimated that more than one half of software in use today is pirated. Obviously, it is in the best interests of software providers to reduce software piracy.

In the specification and claims that follow all items peripheral to computer functionality such as disk drives including hard disk drives, smart card readers, scanners, keyboards, printers, imaging devices, etc. are referred to as peripheral devices.

The invention provides a unique method for distribution of piracy-protected software. The method relies on a peripheral device such as a smart card to unlock software in order to permit execution thereof. The smart card is a credit card sized electronic device comprising memory, a processor and an interface. The processor provides for predetermined and/or flexible execution of software within the smart card. The memory comprises RAM for use during software execution and ROM for long term storage of information. Preferably, some electrically erasable ROM is provided to allow for reprogramming of the smart card. A smart card is a suitable storage medium for storing data related to an authorised use of a software application. The data are stored in ROM within the smart card and the ROM are only accessible to the software application. Such a smart card is immutable and therefore, prevents software piracy. As such, only an individual with the smart card for a particular software package may execute the software. In an embodiment, each software application is customised to operate with only one unique smart card thereby restricting use of the application to systems in communication with the one unique smart card.

In a further embodiment, the smart card is provided with security such as a password or biometric information verification to prevent theft of the software or unauthorised use thereof. Though the method according to the invention is described with reference to fingerprint registration, it is applicable to other biometric information and methods of user authentication using that biometric information. An individual's biometric information in the form of a fingerprint, retinal scan, palm print, voice print, etc. from a biometric information source in the form of a fingertip, eye, hand, voice, etc. is captured using a biometric information input device in the form of a contact imager, eye scanner, or a microphone. Contact imager, as described above, are known in the art of electronic security. Using a contact imager, a fingerprint is digitised and, using a processor, the digitised fingerprint is characterised. Characterisation of fingerprints is known in the art of fingerprint analysis and, in general involves extracting features in a substantially global reference frame for comparison against template features.

Figure 1A:
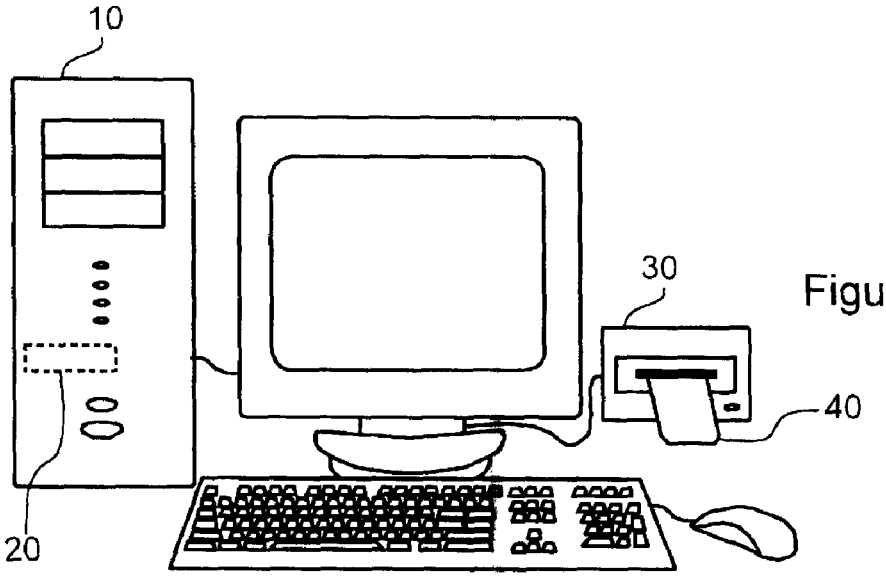
FIG. 1a is a simplified diagram of a system according to the invention for protecting a software application from piracy using a smart card.
Figure 1B:
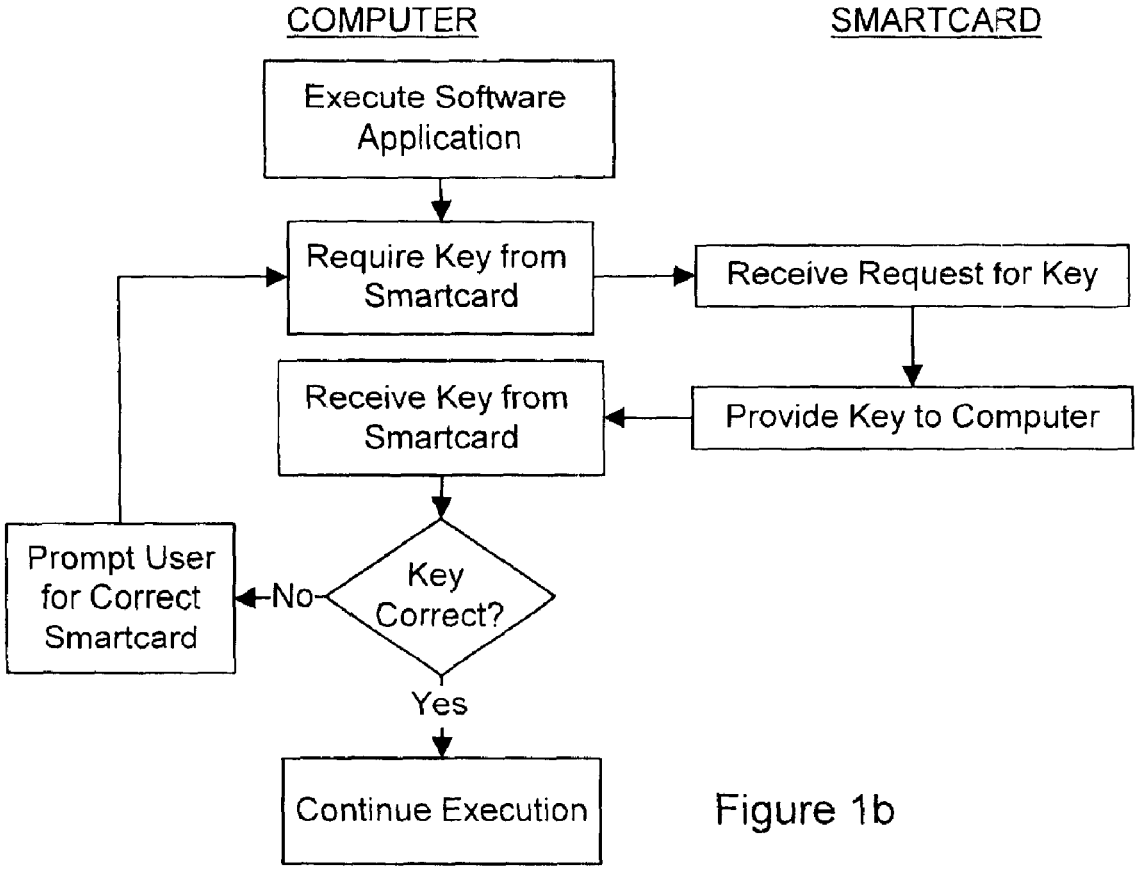

The characterised digitised biometric information is registered with stored templates to locate a template that, within a predetermined level of security in the form of a predetermined false acceptance rate, matches the characterised information. When a match is detected, the individual is identified and a corresponding action is performed. Alternatively, when identification is not necessary the individual is authenticated. Some known actions performed based on biometric authentication include system access, unlocking a door, logging access, providing personal information, billing an individual, etc. Referring to FIGS. 1a and 1b, a simplified diagram of a method to protect a software application from piracy according to the invention is shown. A software provider during packaging customises a software application 20 to a particular smart card 40. The smart card 40 and the software application 20 are then packaged together for sale. The smart card 40 and the software application 20 within the package function to provide a purchaser with operational software. Absent the smart card 40, the software application 20 will not function.

Such a software package is not easily pirated. Either the software instructions requiring the presence of the smart card are removed, or the smart card is duplicated. Neither of these is easily accomplished. Therefore, simple drag and drop piracy is prevented greatly reducing the amount of piracy. Further, pirated copies are more easily detected for enforcement of copyright in software.

The software application 20 is installed on a computer 10 to which a smart card reader 30 is connected. In order to execute the software application 20 the smart card 40 is inserted into the smart card reader 30 in order to validate an authorised use of the software. The validation occurs during start up of the software application 20 or every so often during start up or normal use. The validation merely verifies a presence of the smart card 40 associated with the software application 20. When the correct smart card 40 is not present, the user is prompted to insert the correct smart card 40 and software execution is paused until the correct smart card 40 is detected.

Figure 2A:
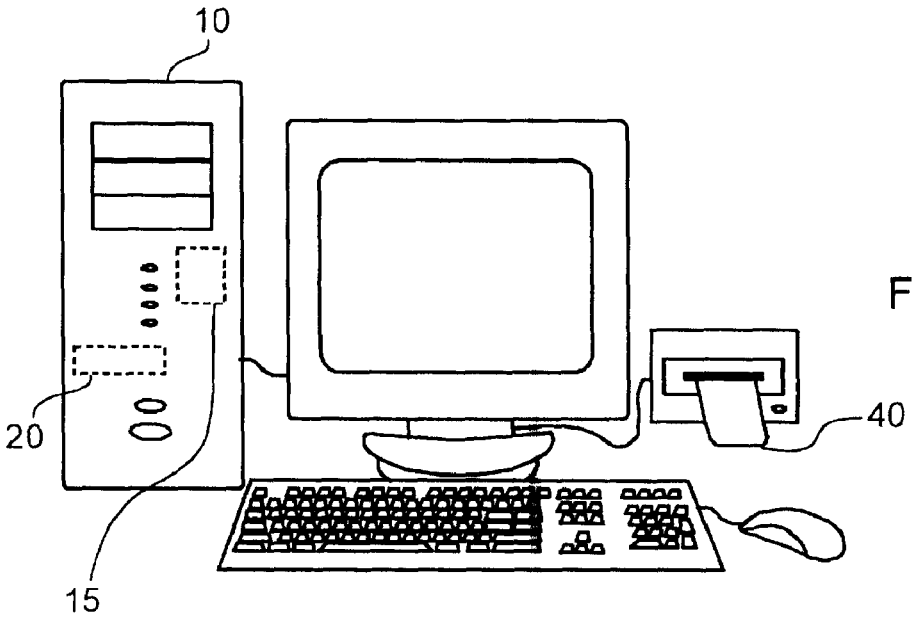
FIG. 2a is a simplified diagram of a system according to the invention for protecting a software application from piracy storing a serial number of a processor memory of a smart card.
Figure 2B:
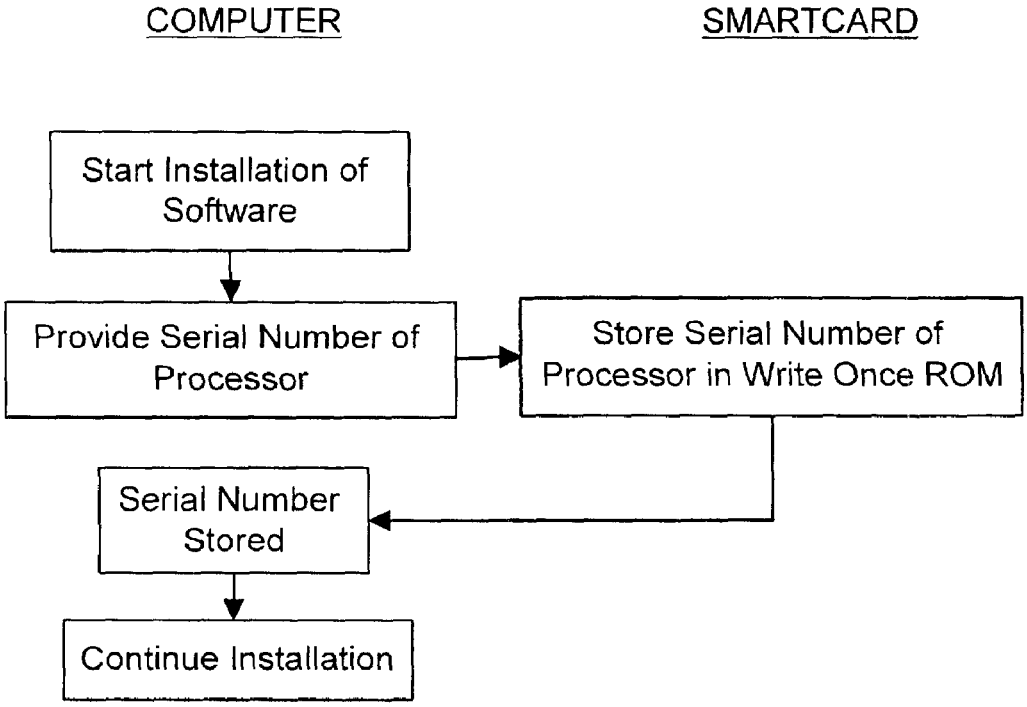
Figure 2C:
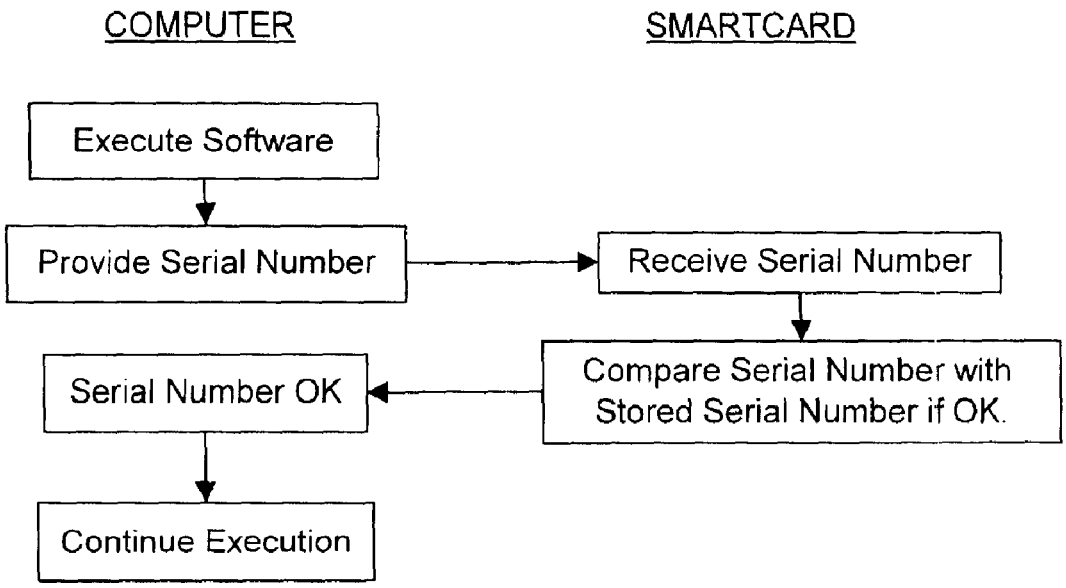

FIGS. 2a, 2b and 2c show a simplified diagram of another method according to the invention. During installation of a software application 20 a serial number of a processor 15 for executing the software application 20 is written on a write once ROM of a smart card 40 which is provided together with the software. During an initialisation of the software application 20 or at intervals during execution of the software application 20 the authorised use of the software application 20 is validated. The validation verifies a presence of the smart card 40 and the serial number of the processor 15. Providing secure access to the serial number of a processor is known to those of skill in the art, for example as disclosed in U.S. Pat. No. 5,790,663 issued Aug. 4, 1998 to Lee et al. Writing a serial number of a processor on a write once ROM of a smart card limits the execution of a software application to one processor. In case a user wants to resell the software application or wants to change the processor for executing the software application he would contact a software provider for a new smart card. Therefore, this method provides a software provider with the ability to control distribution of a software application by limiting the execution of the software application to one processor, while allowing a user to resell software or change the processor on which the software is executed. The difficulties involved in removing instructions requiring a presence of the smart card or the inherent difficulties of copying the smart card substantially prevent piracy of the software application. Writing a serial number of a processor into a software application upon installation is disclosed in U.S. Pat. No. 5,790,663. Unfortunately, this still allows copying and distribution of a software application prior to installation because the piracy protection—the serial number—is yet to be stored within the application.

Figure 3A:
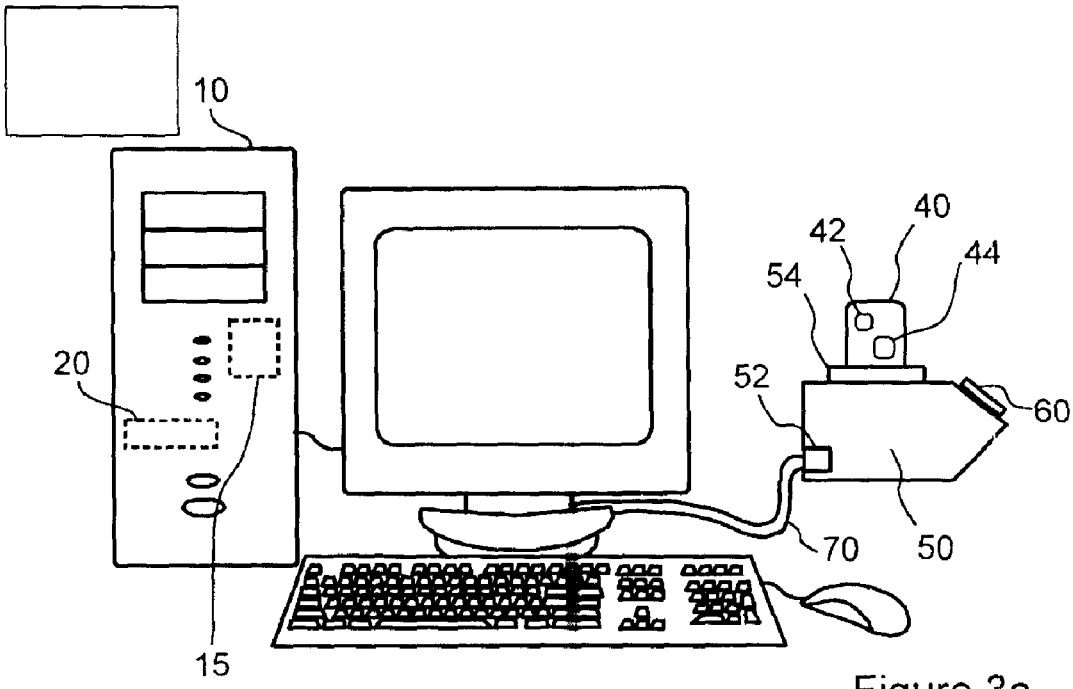
FIG. 3a is a simplified diagram of a preferred embodiment of a system according to the invention for protecting a software application from piracy comprising a smart card reader with a contact imager disposed therein.
Figure 3B:
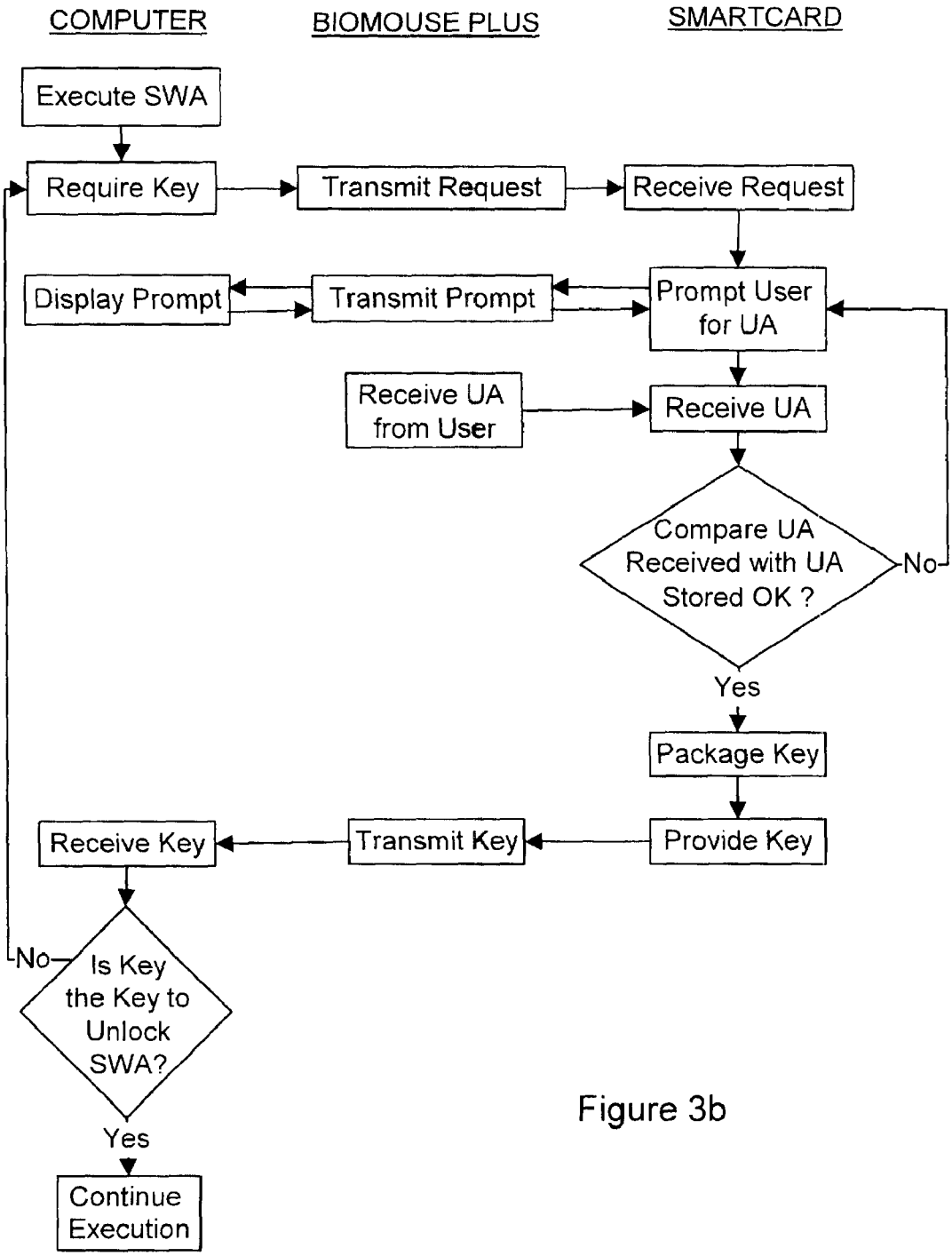

Referring to FIGS. 3a and 3b, a preferred embodiment of a method for protecting a software application from piracy according to the invention is shown. The software application 20 is installed on a computer 10. A smart card reader 50 is connected through a first port 52 via a cable 70 to the computer 10. A smart card 40 comprising a processor 42 and memory 44 is connected through a second port 54 to the smart card reader 50. Furthermore, a contact imager 60 is disposed within the housing of the smart card reader 50. For example, a smart card reader with a built in contact imager for use with a personal computer is available from American Biometric Corporation® under the product name the Biomouse Plus®. During execution, the software application 20 requires that data indicative of an authorised use be provided from the smart card 40. Upon receipt of a request for the-data indicative of an authorised use a user is prompted for fingerprint information. The user provides the fingerprint information using the contact imager 60. The fingerprint information is provided to the smart card 40. Preferably, the information is not accessible to the computer 10. The fingerprint information is compared with fingerprint information stored in the memory 44 of the smart card 40 using the processor 42. If the comparison result is indicative of an authorised user of the software application, data indicative of the authorised use in the form of a key to unlock the software application is provided to the computer 10. Using a processor 15 of the computer, the received data is validated. Validating the data ensures that only a smart card 40 for use with the software application is used. Optionally, validation includes decryption of the data using a known decryption key. The method according to the invention is highly advantageous compared to prior art methods from the point of view of a software provider as well as a user. It provides additional security by storing data related to user authorisation such as a password or, preferably, biometric information within a peripheral device for use in enabling and disabling software execution. Use of biometric information is preferred because it is a substantially secure form of user authorisation. Storage of data related to user authorisation enables a software provider to require user registration prior to installation of the software. Therefore, this method provides a software provider with a substantially secure method to control distribution of a software application and to protect it from piracy. Since a smart card is required to execute the software application, only those who purchase the smart card from the software provider have access to executable copies of the software. At the same time it provides benefits to a user by securing a software application from unauthorised use and additionally securing access to files, for example when the software application is needed to open a file.

Optionally, a processor is disposed within the smart card reader 50. Fingerprint information is received from the contact imager 60 and compared with fingerprint information transmitted from the smart card 40 using the processor disposed within the smart card reader 50 to produce a comparison result. If the comparison result is indicative of an authorised user of the software application 20, data indicating an authorised use of the software application are transmitted from the smart card 40 via the smart card reader 50 to the computer 10.

Alternatively, security is further enhanced by encrypting the data indicating an authorised use of the software application 20 with asymmetric encryption using the processor 42 of the smart card 40 prior to the transfer to the computer 10. Using the processor 42 of the smart card 40 for encryption provides a secure communication link for transferring the data and allows alterations to the encryption key for each data transfer, thus preventing tampering with the data.

In another embodiment according to the invention the smart card reader 30 and the contact imager 60 are included in a computer pointing device such as a mouse.

Optionally, the smart card reader 50 and the contact imager 60 are disposed within a keyboard connected to the computer 10.

Further optionally, the smart card reader 50 is included in a track pad, wherein the pointing device of the track pad is used as a capacitive contact imager to provide fingerprint information.

FIG. 4a shows another system for implementing the method according to the invention. A smart card reader 30 is connected to computer 10. Furthermore, a contact imager 80 is connected to the computer 10. Using this system for implementing a method according to the invention, biometric information received at the contact imager 80 is transferred from the contact imager 80 via the computer 10 to smart card 40. Transferring the biometric information via the computer 10 enhances the risk of interference by a third party while the data is within the computer 10.

The system shown in FIG. 4b comprises a smart card 45 comprising a capacitive contact imager 46. The smart card 45 is connected to a computer 10 via a smart card reader 30. The biometric information is captured and compared absent provision of the biometric data to the computer. A major drawback of this system is the high cost manufacturing a capacitive contact imager, thus making the smart card expensive.

FIG. 5 shows another embodiment of a method according to the invention, wherein one smart card is used for securing a plurality of software applications. During execution of a software application, data related to the software application and biometric information relating to a user of the software are provided to a smart card along with a request for data indicative of an authorised use of the software application. After receipt of the request, the biometric information and the data, the biometric information is compared with biometric information stored within the smart card. If the comparison is indicative of an authorised user of the software application, data indicating an authorised use of the software application is selected based on the data provided to the smart card from a plurality of data indicating an authorised use for different software applications. This method enables a user to execute several software applications of a same software provider using only one smart card. It is highly advantageous for simultaneous execution of several software applications.Simultaneous execution of applications is supported by many common computer operating systems.

In FIG. 6 a method according to the invention is shown, wherein biometric information of a plurality of users is stored on one smart card. The method is similar to those set out above except that upon receipt of the biometric information, it is compared with the stored biometric information of the plurality of users. If the biometric information is indicative of an authorised user of the software application from the plurality of authorised users, data indicating an authorised use are provided to the computer. This method is highly advantageous when a plurality of users have access to a same computer, for example employees working at a same computer at different times during a day or system administrators in a corporation who wish to have access to all applications on all computers. A same smart card is left inserted in a smart card reader connected to the computer permitting execution of the software application to authorised employees.

FIG. 7a shows yet another embodiment of a method according to the invention. Different versions of a software application require different data indicating an authorised use of the software application. Each user is provided with a smart card having data indicative of an authorised use stored in memory. The data relates to a specific version of the software application. At start up and at intervals during execution of the software application, data indicating an authorised use is provided by a user of the software. The data is in the form of biometric information of the user. After receipt and comparison of the biometric information, data indicating an authorised use is provided to a computer in execution of the software application. The data, once received is used to determine a version of the software application for execution. Alternatively, if the provided data do not indicate an authorised use of a current version of the software application further execution of the version is disabled.

Referring to FIG. 7b, a simplified diagram of a computer network 700 is shown. A plurality of workstations 704, each comprising a personal computer, are connected by cables 706 to a server 702. The workstations 704 are computer systems for use by users. The server 702 is for providing central file storage, network applications, and more powerful processors for processor intensive tasks. Some common network applications include email, Intranet, employee phone list, etc. Other network peripherals comprise printers, scanners, etc. (not shown). A system administrator maintains the computer network and authorises individual users thereof. Networks are well known in the art of computer systems and computer network architectures. They are installed in many businesses world-wide.

The method shown in FIG. 7a is highly advantageous for use with a computer network. Different versions of a software application 720 are stored on the server 702. A user is permitted to use a predetermined version of the software. During start up of the software application, data indicative of an authorised use of a particular version are provided from the workstation 704 to the server 702. According to the provided data the indicated version is selected and provided to the workstation 704 for execution. Alternatively, the indicated version of the application is executed on the server 702. At intervals during execution of the software application, provision of data indicating an authorised use of the version is required and execution of the software application is interrupted when not provided. Therefore, according to this embodiment limited use of a software application according to employee work profile is permitted. In another embodiment of a method according to the invention shown in FIG. 8 additional data, comprising time varying data, are stored in the form of an indication of a maximum number of executions of a software application and a number indicating a current count of performed executions. At start up the two numbers are compared and if the number of performed executions is equal to the maximum number of executions further execution of the software application is disabled. This method allows a software provider to rent a software application. A user renting a software application is provided with the software and a smart card. The smart card comprises data indicating the maximum number of executions. If the maximum number is reached and the user wants to continue renting the software application the software provider sends a new smart card or transfers a file to be stored on the smart card.-Alternatively, the software is rented for a time period. In this case a time signal provided by a processor in execution of the software application is compared with time data stored in memory. Of course, it is preferred that the time data is provided by a timing circuit within the smart card in order to prevent clock tampering.

Alternatively, some of the additional data and some commands for execution on a processor are programmable by an authorised user. For example, a system administrator programs smart cards for use by employees of a company with a time limitation in order to prevent the employees from using the software application outside their work hours.

It is evident to those of skill in the art that prompting a user is realised in different ways depending on design criteria. One embodiment is to prompt the user for biometric information only during the installation of the software and to require a presence of a smart card during execution. This embodiment protects a software application from piracy and increases user convenience by prompting only once for biometric information but it allows execution of the software application to any user in possession of the smart card. Other methods include prompting a user for biometric information at the start-up of the software application and/or during the execution of the software application. Prompting during the execution of the software application is performed according to one of the following methods: one prompt at the beginning of software execution, several prompts at intervals during the use of the software application, and after breaks in use of the software application. Prompting the user several times during execution of a software application creates user inconvenience but may be desirable, for example in computer networks, to prevent unauthorised use of a software application on a workstation within the network. When user authorisation information in the form of biometric information is to be provided frequently, transparent biometric data collection, i.e. the user is identified by collecting biometric information such as voice recognition, facial recognition, keystroke intervals etc., avoids the inconvenience of a plurality of pauses in software application execution and prompts during the pauses which increase user convenience.

As is evident to those of skill in the art, there are numerous methods to distribute a piracy protected software application according to the invention. For example a user sends biometric information to a software provider. The software provider then customises the software application by packaging the biometric information in a smart card and sends the software application together with the smart card to the user. The software application is executed only in presence of the smart card and the biometric information provided by the user. In another method a software provider sells the software application together with a smart card, the smart card comprising write once ROM. Upon installation, the user is prompted to store the biometric information in the smart card before completing same. Of course, when the smart card comprises rewritable ROM, the software application is transferable. It is evident to those of skill in the art, that because the smart card is needed to execute the software application, a number of executable copies of a software application is effectively limited to a number of interworking smart cards.

Alternatively, a software provider distributes a software application together with a smart card for a trial period and provides a user after registration with a registration file which is stored in the smart card.

Numerous other embodiments may be envisaged without departing from the spirit and scope of the invention.

What is claimed is:

1. A method for protecting a software application from piracy, comprising [the steps of]:

[providing] *storing* data indicative of an authorised use of the software application;

executing a first portion of the software application;

receiving user authorisation information;

using a processor within a peripheral device, comparing the received user authorisation information with user authorisation information stored in memory of the peripheral device to produce a comparison result and, if the comparison result is indicative of the authorised user of the software application, providing data from the peripheral device to the computer, the data indicative of the authorised use of the software application on the computer;

executing a second portion of the software application only upon receipt of the data indicative of the authorised use of the software application;

transmitting data related to the software application to the peripheral device; and, comparing the received data with data stored in memory of the peripheral device using the processor of the peripheral device;

and wherein [the step of] providing data from the peripheral device comprises [the step of]:

selecting the data indicative of the authorised use of the software application on the computer according to the data related to the software application, the data selected from a plurality of instances of data, each instance of data indicative of the authorised use of a different software application.

2. A method for protecting a software application from piracy, comprising [the steps of]:

[providing] *storing* data indicative of an authorised use of the software application;

executing a first portion of the software application;

receiving user authorisation information;

using a processor within a peripheral device, comparing the received user authorisation information with user authorisation information stored in memory of the peripheral device to produce a comparison result and, if the comparison result is indicative of the authorised user of the software application, providing data from the peripheral device to the computer, the data *being* indicative of the authorised use of the software application on the computer;

executing a second portion of the software application only upon receipt of the data indicative of the authorised use of the software application;

wherein [the step of] comparing the received user authorisation information with the user authorisation information stored in memory of the peripheral device to produce a comparison result comprises [the step of]:

comparing the provided user authorisation information with a plurality of instances of user authorisation information stored in memory.

3. [A method for protecting a software application from piracy as defined in] *The method of* claim 2[,] wherein [the step of] providing data from the peripheral device *further* comprises [the step of:]

selecting data indicative of the authorised use of the software application from a plurality of instances of data, the selection based on the user authorisation information provided.

4. [A method for protecting a software application from piracy as defined in] *The method of* claim 3, *further* comprising [the step of]:

selecting a version of the software application based on the data indicative of the authorised use of the software application received from the peripheral device.

5. A method for protecting a software application from piracy, comprising [the steps of]:

[providing] *storing* data indicative of an authorised use of the software application;

executing a first portion of the software application;

receiving user authorisation information;

using a processor within a peripheral device, comparing the received user authorisation information with user authorisation information stored in memory of the peripheral device to produce a comparison result and, if the comparison result is indicative of the authorised user of the software application, providing data from the peripheral device to the computer, the data *being* indicative of the authorised use of the software application on the computer;

executing a second portion of the software application only upon receipt of the data indicative of the authorised use of the software application;

storing a first instance of data in memory of the peripheral device;

storing a second instance of data in memory of the peripheral device; and, using the processor of the peripheral device, comparing the second instance of data with the first instance of data to produce a comparison result, and if the comparison result is indicative of an authorised use of the software application, providing data indicative of the authorised use of the software application and calculat[e]*ing* a new second instance of data to replace the second instance of data.

*6. The method of claim 5 wherein the providing data from the peripheral device comprises selecting data indicative of the authorized use of the software application from a plurality of instances of data, the selection based on the user authorisation information provided.*

*7. The method of claim 6, further comprising selecting a version of the software application based on the data indicative of the authorized use of the software application received from the peripheral device.*

*8. The method of claim 1, further comprising selecting a version of the software application based on the data indicative of the authorized use of the software application received from the peripheral device.*

*9. A system for protecting a software application from piracy comprising:*

*a computer including a processor configured to unlock and execute a locked software application and an input device configured to accept user authorization information indicative of an authorized use of the software application; and*

*a peripheral device including a memory and a processor, the peripheral device being configured to receive the user authorisation information and the processor being configured to compare the received user authorization information with user authorization information stored in the memory to produce a comparison result and, if the comparison result is indicative of the authorized user of the software application, the peripheral device is configured to provide data to the computer, the data being indicative of the authorized use of the software application on the computer;*

*wherein the computer is configured to unlock the software application for execution upon receipt of the data indicative of the authorized use of the software application.*

*10. The system of claim 9 wherein the peripheral device comprises a smart card and the software application is configured to operate with a single smart card.*

*11. The system of claim 10 wherein the memory of the peripheral device includes a serial number of a processor authorized to execute the software application and the computer is configured to unlock the software application only if the serial number in the memory of the peripheral device matches the serial number of the processor of the computer.*

*12. The system of claim 9 wherein the peripheral device comprises a smart card that is secured with a password or biometric information and may not be accessed unless the computer provides a password or biometric information identifying the user.*

*13. The system of claim 9 wherein the peripheral device comprises a smart card, and wherein the computer is configured to periodically check for the presence of the smart card and to pause execution of the software until the smart card is detected and the data indicative of the authorized use of the software application is received.*

*14. The system of claim 9, further comprising a contact imager for scanning a fingerprint of a user, the contact imager providing biometric data representative of the user's fingerprint to the peripheral device for comparison with biometric data stored in the memory of the peripheral device, wherein the data indicative of the authorized use of the software application is provided to the computer if the user's biometric data matches the biometric data stored in the memory of the peripheral device.*

*15. The system of claim 9 wherein the software application is encrypted and the data indicative of the authorized use of the software application comprises a decryption key for decrypting the encrypted software application.*

*16. The system of claim 9 wherein the peripheral device comprises a smart card containing biometric data of a user authorized to execute the software application stored in the memory of the smart card, and wherein the system further comprises:*

*a smart card reader comprising a memory including biometric data of the user of the computer and a processor configured to compare the biometric data from the smart card to biometric data stored in the memory of the smart card reader, wherein the data indicative of the authorized use of the software application is provided to the computer if the biometric data stored in the memory of the smart card reader matches the biometric data stored in the memory of the smart card.*

*17. The system of claim 9 wherein the data indicative of the authorized use of the software application is encrypted by the peripheral device using asymmetric encryption prior to transfer to the computer.*

*18. The system of claim 9 wherein the peripheral device comprises a smart card, and wherein the system further comprises a computer pointing device including a smart card reader and a contact imager.*

*19. The system of claim 9 wherein the peripheral device comprises a smart card and the input device comprises a keyboard including a smart card reader and a contact imager.*

*20. The system of claim 9 wherein the peripheral device comprises a smart card, and wherein the system further comprises a track pad having a pointing device including a capacitive contact imager to provide fingerprint information.*

*21. The system of claim 9 wherein the peripheral device comprises a smart card having a capacitive contact imager.*

*22. The system of claim 9 wherein the memory of the peripheral device includes user authorization information of a plurality of users, and wherein the data indicative of the authorized use of the software application is provided to the computer if the received user authorization information matches the user authorization information of at least one of the plurality of users.*

*23. The system of claim 9 wherein the memory of the peripheral device includes user authorization information relating to a specific version of the software application, and wherein the data indicative of the authorized use of the software application indicates which version of the software application the computer is authorized to unlock for execution.*

*24. The system of claim 23 wherein the computer comprises a server, and wherein the memory of the server includes different versions of the software application.*

*25. The system of claim 9 wherein during execution of the unlocked software application the computer periodically requests the input of user authorization information for continued execution of the software application.*

*26. The system of claim 9 wherein the peripheral device comprises a smart card, and wherein the memory of the smart card comprises data indicating a maximum number of executions of the software application permitted by the computer, and further wherein a number indicating a current count of the executions of the software application is compared to the maximum number of executions of the software application permitted by the computer and further execution of the software application is disabled if the number equals the maximum number.*

*27. The system of claim 9 wherein the peripheral device comprises a smart card, and wherein the memory of the smart card comprises data indicating a time period for which execution of the software application by the computer is permitted, and further wherein a time signal provided by the processor of the computer is compared to the time period stored in the memory of the smart card and further execution of the software application is disabled if the comparison indicates that the time period has expired.*

*28. The system of claim 9 wherein the peripheral device comprises a smart card, and wherein the memory of the smart card contains the biometric data of the user.*

*29. The system of claim 9 wherein the peripheral device comprises a smart card, and wherein the memory of the smart card comprises a write once ROM in which the user stores the user's biometric data upon installation of the software application in the computer.*

*30. A system for protecting software applications from piracy, the system comprising:*

*a computer including a processor configured to unlock and execute a plurality of locked software applications and an input device configured to accept user authorization information indicative of an authorized use of one or more of the software applications; and*

*a peripheral device including a memory and a processor, wherein the peripheral device is in communication with the computer and configured to receive the user authorization information and identification of the one or more software applications for which authorization is requested, and wherein the processor is configured to compare the received user authorization information with user authorization information stored in the memory to produce a comparison result and, if the comparison result is indicative of the authorized user of the one or more software applications for which authorization is requested, the peripheral device is further configured to provide data to the computer, the data being indicative of the authorized use of the one or more of the software applications on the computer,*

*wherein the computer is configured to unlock the one or more software applications for execution upon receipt of the data indicative of the authorized use of the one or more software applications.*

*31. A system for protecting a software application from piracy comprising:*

*a locked software application configured to be unlocked only by an authorized user; and*

*a smart card including a memory having user authorization information indicating an authorized user of the software application,*

*wherein during execution of the locked software application in a computer, the computer is configured to unlock the locked software application if user authorization information provided by the user matches the authorized user information stored in the smart card, and*

*wherein the smart card further comprises a processor configured to compare the received user authorization information with user authorization information stored in the memory to produce a comparison result and, if the comparison result is indicative of the authorized user of the software application, data indicative of the authorized use of the software application is provided to the computer to unlock the software application for execution.*

*32. The system of claim 31 wherein the software application is configured to operate with a single smart card.*

*33. The system of claim 31 wherein the smart card is secured with a password or biometric information and may not be accessed unless the computer provides a password or biometric information identifying the user.*

*34. The system of claim 31 wherein the memory of the smart card includes a serial number of a processor authorized to execute the software application, and wherein the computer is configured to unlock the software application only if the serial number in the memory of the smart card matches the serial number of a processor of the computer.*

*35. The system of claim 31 wherein the memory of the smart card includes biometric data that is compared to biometric data representative of the user's fingerprint, and wherein the data indicative of the authorized use of the software application is provided to the computer if the user's biometric data matches the biometric data stored in the memory of the peripheral device.*

*36. The system of claim 31 wherein the software application is encrypted, and wherein the data indicative of the authorized use of the software application is a decryption key for decrypting the encrypted software application.*

*37. The system of claim 31 wherein the data indicative of the authorized use of the software application is encrypted by the smart card using asymmetric encryption prior to transfer to the computer.*

*38. The system of claim 31 wherein the smart card includes a capacitive contact imager.*

*39. The system of claim 31 wherein the memory of the smart card includes user authorization information of a plurality of users, and wherein the data indicative of the authorized use of the software application is provided to the computer if the received user authorization information matches the user authorization information of at least one of the plurality of users.*

*40. The system of claim 31 wherein the memory of the smart card includes user authorization information relating to a specific version of the software application, and wherein the data indicative of the authorized use of the software application indicates which version of the software application the computer is authorized to unlock for execution.*

*41. The system of claim 31 wherein the memory of the smart card comprises data indicating a maximum number of executions of the software application permitted by the computer, wherein a number indicating a current count of the executions of the software application is compared to the maximum number of execution of the software application permitted by the computer and further execution of the software application is disabled if the number equals the maximum number.*

*42. The system of claim 31 wherein the memory of the smart card comprises data indicating a time period for which execution of the software application by the computer is permitted, and wherein a time signal provided by a processor of the computer is compared to the time period stored in the memory of the smart card and further execution of the software application is disabled if the comparison indicates that the time period has expired.*

*43. The system of claim 31 wherein the memory of the smart card contains the biometric data of the user.*

*44. The system of claim 31 wherein the memory of the smart card comprises a write once ROM in which the user stores the user's biometric data upon installation of the software application in the computer.*

* * * * *

UNITED STATES PATENT AND TRADEMARK OFFICE

CERTIFICATE OF CORRECTION

PATENT NO. : RE42,861 E
APPLICATION NO. : 11/400074
DATED : October 18, 2011
INVENTOR(S) : Borza It is certified that error appears in the above-identified patent and that said Letters Patent is hereby corrected as shown below:

On the Title Page:

Item [64], Replace sub-heading, PCT Filed: with sub-heading, Filed.

Signed and Sealed this
First Day of November, 2011

David J. Kappos

David J. Kappos
*Director of the United States Patent and Trademark Office*

UNITED STATES PATENT AND TRADEMARK OFFICE

CERTIFICATE OF CORRECTION

PATENT NO. : RE42,861 E
APPLICATION NO. : 11/400074
DATED : October 18, 2011
INVENTOR(S) : Borza It is certified that error appears in the above-identified patent and that said Letters Patent is hereby corrected as shown below:

Column 12, line 18, in Claim 3, delete "[the step of:]" and insert -- [the step of]: --.

Signed and Sealed this
Twenty-sixth Day of June, 2012

David J. Kappos

David J. Kappos
*Director of the United States Patent and Trademark Office*